Nov. 2, 1954  M. J. O. LOBELLE  2,693,326
EJECTABLE SEAT FOR AIRCRAFT
Filed June 2, 1952  5 Sheets-Sheet 1
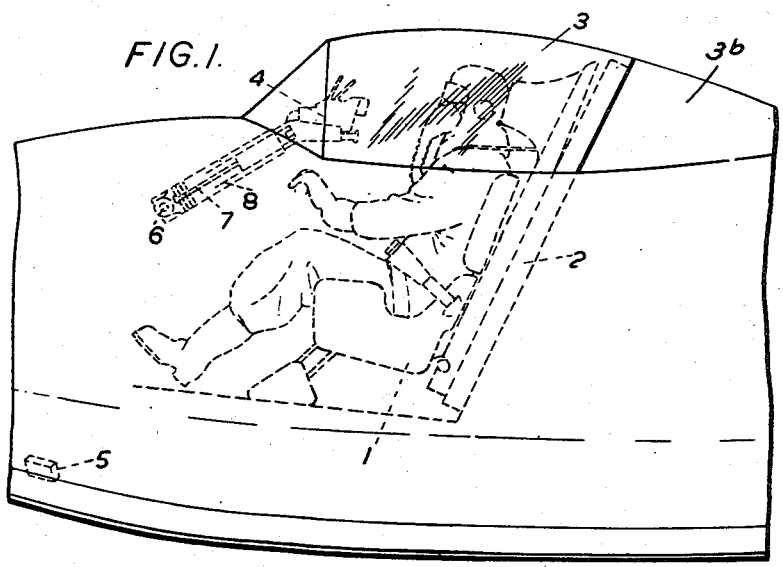
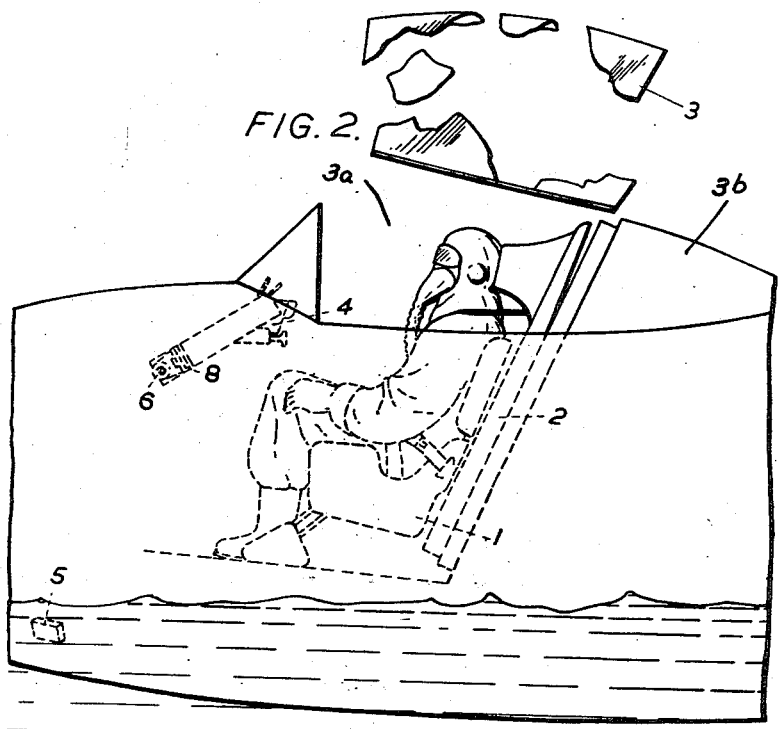
Inventor
MARCEL JULES ODILON LOBELLE
By
Bailey, Stephens & Huettig
Attorneys

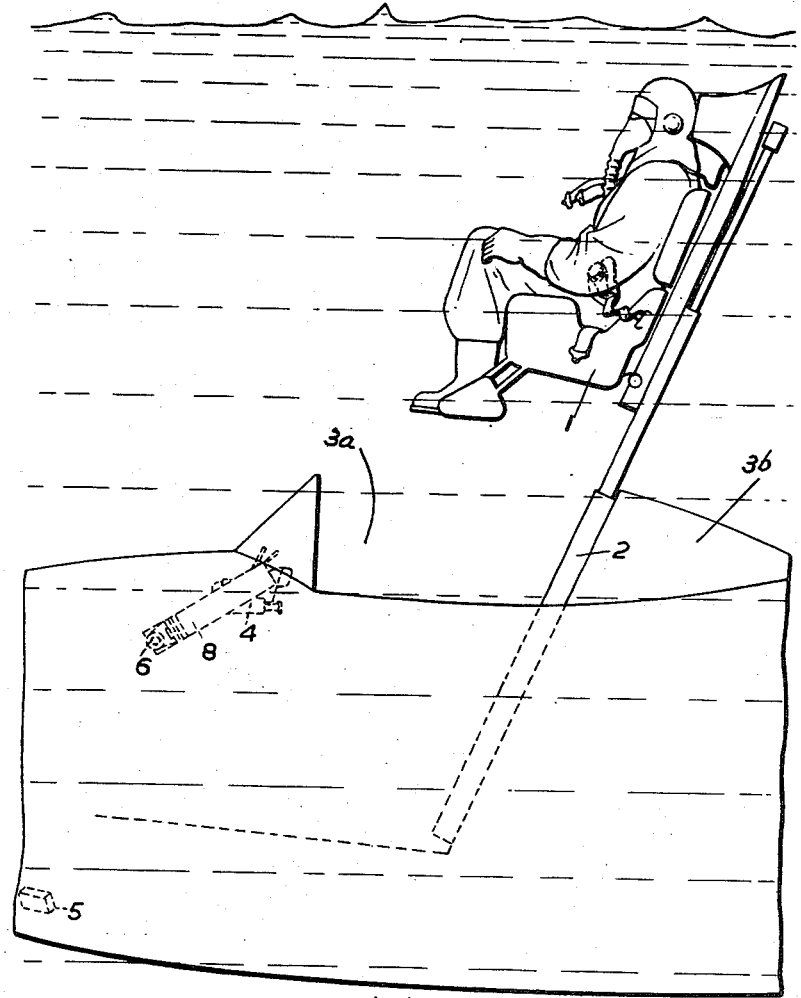

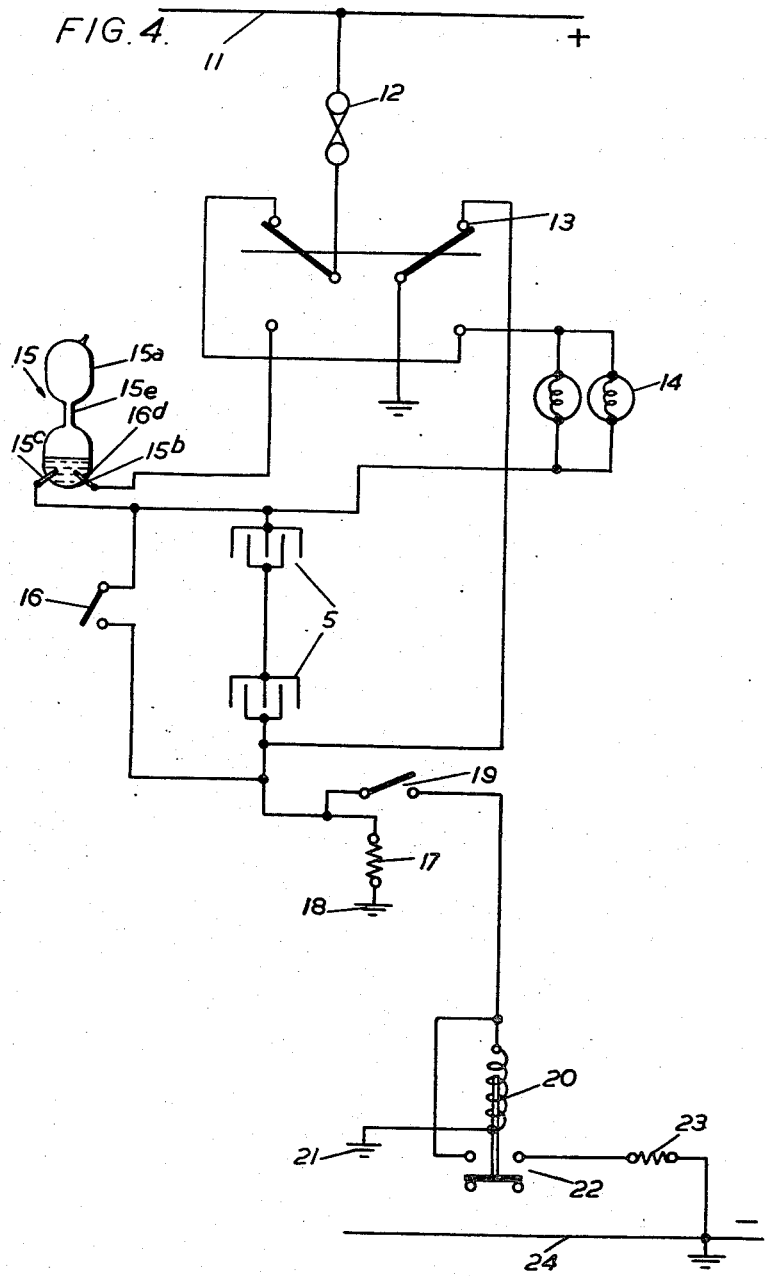

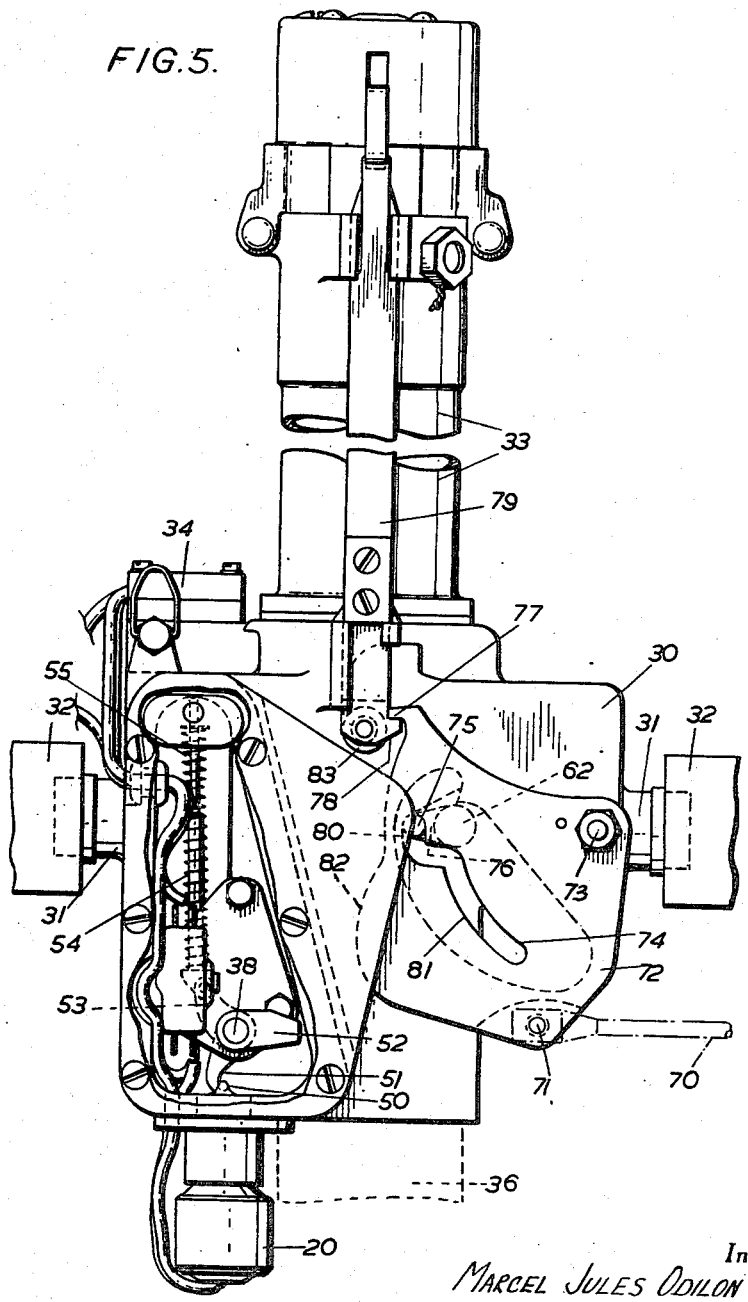

Nov. 2, 1954 — M. J. O. LOBELLE — 2,693,326
EJECTABLE SEAT FOR AIRCRAFT
Filed June 2, 1952 — 5 Sheets-Sheet 5

Inventor
MARCEL JULES ODILON LOBELLE
By
Bailey, Stephens & Huettig
Attorneys

United States Patent Office 2,693,326
Patented Nov. 2, 1954

2,693,326

EJECTABLE SEAT FOR AIRCRAFT

Marcel Jules Odilon Lobelle, Slough, England, assignor to M. L. Aviation Company Limited, Slough, England, a British company Application June 2, 1952, Serial No. 291,113

Claims priority, application Great Britain June 4, 1951

7 Claims. (Cl. 244—122)

This invention relates to ejection apparatus for aircraft in which, in the case of an emergency, a seat can be propelled by an expulsion device along guides and ejected through an opening in the aircraft, thus enabling the airman to make a safe descent by parachute.

The airman is generally strapped to his seat by means of releasable attachments between his combined parachute and safety harness and the seat. These attachments can be automatically released when the airman is ejected in an emergency in the air, but on the ground they must be operated by hand. Moreover there are other operations which have to be carried out, such as removing a cockpit canopy before the airman is free to climb out of the aircraft. It may happen, therefore, that in the event of a crash or forced landing, particularly when fire breaks out, or alternatively, if the aircraft lands in water, the airman may not have an opportunity to make his escape due either to injury or to other reasons.

According to the present invention, in the event of a crash landing, a cover in the roof of the aircraft is automatically opened and the airman is ejected at a relatively low velocity which is just sufficient to throw him clear of the aircraft. If the aircraft has landed in water, then the automatic operation may be initiated by one or more immersion switches which serve to complete the necessary operating circuit. On the other hand, if the landing is on land, the operating circuit may be arranged to be completed by one or more inertia switches operated by the shock of landing and these may, of course, be connected in parallel with the immersion switches so that the ejection apparatus is brought into action for any type of forced landing.

Whether the landing is on water or land, it is obviously undesirable for the airman to be ejected if the aircraft is inverted, and for this purpose a gravity-operated switch, which is opened if the aircraft is inverted, may also be included in the operating circuit. If the apparatus is to be used in a pilot's cabin where a retractable gunsight is used, this must first be retracted in order to allow for the ejection of the pilot. The retraction may be initiated, therefore, when the cover in the roof of the aircraft is opened and the completion of the retraction may then serve to bring about the ejection of the pilot.

The normal type of cartridge for ejection in the air is very much too powerful for the low velocity ejection required, and an alternative source of power must be employed. An ejection gun having two separate breeches may, therefore, be used, of which the main breech is used in conjunction with the normal cartridge for producing high velocity ejection during flight and an auxiliary breech is used for obtaining the low velocity ejection. For this low velocity, although other forms of power such as compressed air may be used, it is preferred to use a small explosive cartridge situated in communication with the auxiliary breech and to provide the necessary valves for the selective connection of the two breeches with the ejection cylinders of the gun.

Apparatus in accordance with the invention will now be described in more detail by way of example with reference to the accompanying drawings, in which:

Figures 1, 2 and 3 show the sequence of operations when a pilot is ejected after landing in water;

Figure 4 is a circuit diagram of the electrical controlling apparatus;

Figure 5 is an elevation of the ejection gun viewed from one side;

Figure 6:
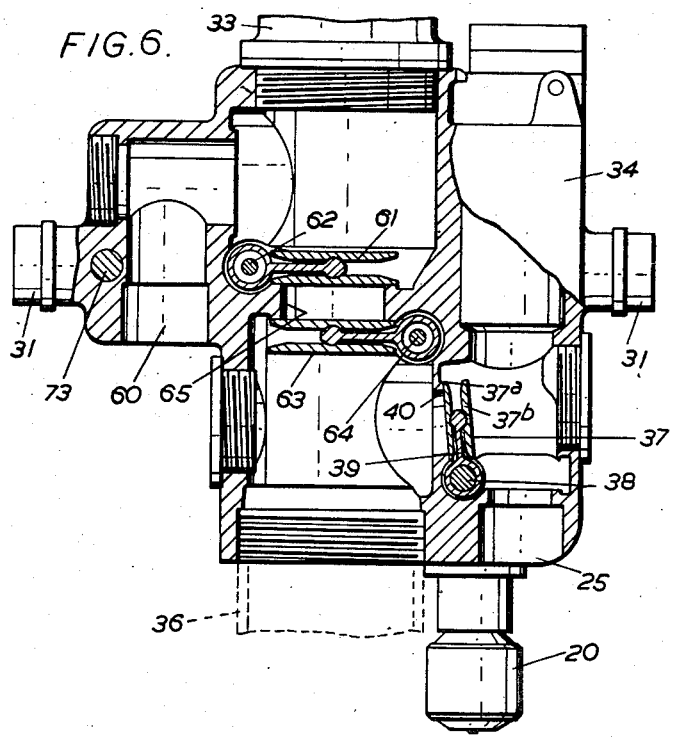
Figure 6 is a partial sectional elevation of the gun viewed from the other side.

Figure 1 shows the pilot in position in the cockpit of his aircraft before making a forced landing. The pilot is strapped to his seat 1, which is arranged to slide in guides 2. The cockpit is enclosed by a canopy 3 which closes an opening 3a in the top of the roof 3b of the cockpit and a gunsight 4 obstructs upward movement of the pilot. An immersion switch is indicated diagrammatically at 5 and may be one of a number of such switches distributed around the aircraft. This switch is a pair of spaced electrodes, as shown in Fig. 4, between which a circuit is completed in the presence of water. As shown in Figure 2, the aircraft has landed in water and the immersion switch 5 has become flooded. As a first step, the canopy 3 has been jettisoned in any suitable manner and the gunsight 4 is in the process of being retracted. For this purpose a small electric motor 6 is provided driving a lead screw 7 which withdraws the gunsight 4 down guides 8. As soon as the gunsight is fully withdrawn, the pilot, complete with his seat 1 is ejected as shown in Figure 3. The velocity of ejection is relatively low and is sufficient merely to throw the pilot clear from the aircraft so as to enable him to rise to the surface of the water.

This sequence of operations is controlled by the circuit shown in Figure 4. The circuit passes from the positive supply line 11 through a fuse 12 to a manually operated double pole changeover switch 13. In the "safe" position of the switch as shown in the drawing, the left-hand pole is connected to a pair of warning lights 14 and thence to a pair of immersion switches 5 connected in series. It is necessary to connect two such switches in series to guard against accidental operation of the circuit which might be caused by deterioration of the chemical filling of the switches. By connecting two such switches in series the possibilities of both deteriorating are reduced to negligible proportions. Thus the switches connected together in pairs are fitted in various parts of the aircraft and the pairs are connected in parallel with one another. For simplicity only one such pair of switches is shown.

The further side of the pair of immersion switches is thus connected via the right-hand pole of the switch to the negative of the supply, which is earthed. If by any chance both of the immersion switches have become conductive, then in the "safe" position, a circuit will be established through the warning lights, and the pilot will be warned of this condition before take-off. Provided, however, that the lights do not light up, the switch may be changed to the alternative or operative position in which the left-hand pole completes a circuit through a gravity-operated switch 15 and then alternatively through a pair of immersion switches 5 and an insertia switch 16 connected in parallel with the immersion switches. As shown the gravity switch consists of a glass tube 15a partly filled with mercury 15b, which makes contact between electrodes 15c and 15d when in the upright position. When in the inverted position, the mercury flows to the other end of the tube to interrupt the circuit. The tube is formed with a neck 15e in the manner of an hour glass to prevent spattering of mercury when the switch is inverted. Any suitable form of gravity-operated switch may, however, be included in the place of the mercury switch illustrated. At the same time, a circuit is also completed via the right-hand pole of the switch through the warning lights which are, therefore, illuminated continuously to indicate that the switch is in its operative position.

Under normal conditions, neither the immersion switches nor the inertia switches are conductive so that the circuit is interrupted at this point. In the event of a crash landing, however, either the immersion switches become conductive owing to the presence of water or the inertia switch is rendered conductive by the shock of landing and the circuit is then completed through a cartridge fuse 17 to earth at 18. The cartridge fired by this fuse 17 starts the retraction of the gunsight which is accomplished in the manner shown in Patent No. 2,569,818, The completion of this retraction causes an interlock switch 19 (corresponding generally to switch 72 of Patent No. 2,569,818) to close, which in its turn continues the circuit through an operating solenoid 20 to earth at 21. This operates a valve in the breech of the ejection gun, and at the same time closes a further pair of contacts 22. This again continues the circuit through a cartridge fuse 23 to the negative supply 24 and thus fires a small cartridge in the ejection gun to eject the pilot as shown in Figure 3.

Figure 7:
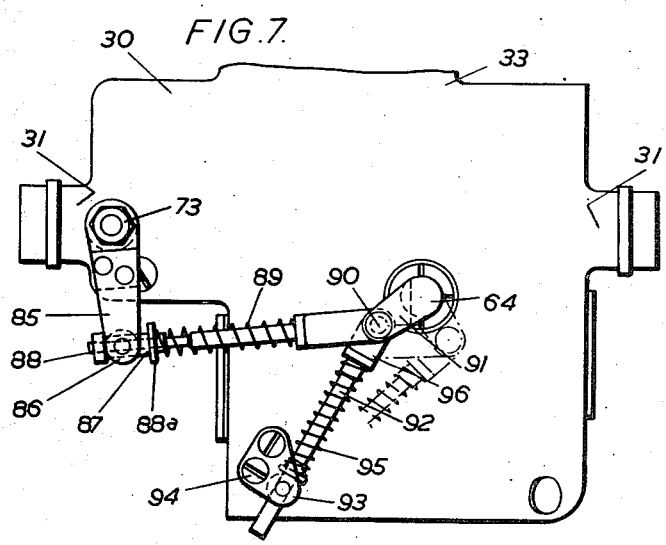
Figure 7 is a partial outside elevation from the same side as Figure 6.

The ejection gun itself is shown in detail in Figures 5 to 7. The gun includes a main body 30 connected by trunnions 31 to the frame of the aircraft at 32. It is formed with a main breech 33 for the reception of a cartridge giving high velocity ejection under airborne conditions in the manner shown in Patent No. 2,579,683 and with an auxiliary breech 34 for the reception of a considerably smaller cartridge for ejection under crash landing conditions. The auxiliary breech 34 is provided with an exhaust port 25 leading to the atmosphere so that if the cartridge is inadvertently fired, the force of the exposion is expended without damage. A port 40 leading from the auxiliary breech to the ejection or expansion cylinders of the gun indicated in dotted lines at 36 is normally closed by a flap valve 37 turning on a spindle 38. This flap valve consists of a pair of plates 37a and 37b mounted on either side of a ball headed arm 39 which gives the valve a certain amount of free motion allowing it to seat squarely either at the mouth of the port 35 or of the port 40.

The cartridge in the auxiliary breech 34 is fired electrically by means of the fuse 23 as already described, and immediately prior to its firing, the flap valve 37 is moved by means of the solenoid 20 into the position in which it covers the exhaust port 35. The operation of the solenoid 20 (as seen in Figure 5) moves the tip of the armature 50 clear of one arm 51 of a bellcrank lever 52 secured to the spindle 38 on which the flap valve 37 is mounted. The second arm 53 of the bellcrank lever is acted on by a spring 54 guided by a rod 55, and when the armature 50 is moved clear of the tip of the arm 51, the spring 54 forces the arm 53 downwardly, causing the spindle 38 to rotate in a counter-clockwise direction as seen in Figure 5. As seen in Figure 6, this gives the flap valve 37 a clockwise movement, serving to close the exhaust port 35 and to open the port 40 to allow the exposive force from the cartridge in the breech 34 to pass into the ejection cylinder of the gun and thus eject the airman.

The main breech 33 contains a considerably larger cartridge, which is fired mechanically by the pilot under airborne conditions. This breech is also provided with an exhaust port 60, which normally connects directly with the breech but which may be closed by a flap valve 61 turning about a spindle 62. The valve 61 has a similar construction to the valve 37 and in its alternative position seals the exhaust port and allows the explosive force from the main breech 33 to pass into the ejection cylinders 36 of the gun. In order to prevent the exposive force from the auxiliary breech blowing back into the main breech, or alternatively, the explosive force from the main breech blowing back into the auxiliary breech, a further flap valve 63 is provided having a similar construction to the valves 37 and 61 and turning about a spindle 64.

In the position shown in Figure 6, the valve 63 is seated against the mouth of a port 65 leading from the main breech 33 to the ejection cylinder 36. Thus the explosive force from the auxiliary breech merely serves to force the valve 63 more firmly against its seating and so positively seals the port 65. Similarly, in its alternative position, the valve 63 seats firmly against the mouth of the port 40, against which it is pressed more firmly by the explosive force from the main breech.

Both the valves 61 and 63 must be moved from the position shown in Figure 6 to their alternative positions immediately before the cartridge in the main breech is fired. As previously described, this operation is carried out mechanically. For this purpose, the operative thrust is transmitted by manual operation of a connecting rod 70 connected at 71 to a plate 72 mounted to turn about a spindle 73 extending through the body 30 of the gun. The plate 72 is formed with a cam slot 74 co-operating with a pin 75 mounted at the end of a short lever arm 76 fixed to the spindle 62 of the valve 61. Operation of the connecting rod 70 rocks the plate 72 in a clockwise direction and the first part of the movement serves to free a nose portion 77 on the plate 72 from a corresponding latch 78 formed on a sliding bar 79 connected to the firing mechanism of the breech 33. During this initial part of the movement, a curved portion 80 of the cam slot 74 moves around the pin 75 and gives it no appreciable movement. The pin 75, however, then enters a portion 81 of the cam slot, which moves it upwardly and to the right as shown in Figure 5, rocking the spindle 62 in a clockwise direction so as to move the valve 61 to close the mouth of the exhaust port 60 and to open the mouth of the port 65. As the plate 72 approaches the limit of its travel, a cam surface 82, formed as a bulge on the plate 72, engages a roller 83 mounted on the bottom of the bar 79, sliding this upwardly to operate the firing mechanism and so fire the cartridge in the breech.

At the same time, the turning motion of the plate 72 has also served to turn the spindle 73 in a clockwise direction as seen in Figure 5, and in an anti-clockwise direction as seen in Figure 7. On the end of the spindle 73 remote from the plate 72 is connected an arm 85 provided at its end with a rotatable bush 86 formed with a transverse bore through which passes a rod 87 to the end of which a nut 88 is secured. The counter-clockwise movement of the arm 85 presses against a washer 88a sliding on the rod 87 and compresses a spring 89, so as to move the rod 87 to the right.

The right-hand end of the rod is pivoted at 90 to a toggle linkage consisting of a lever arm 91 connected to the spindle 64 carrying the valve 63, and a rod 92, which is slidable through a rotary bushing 93 mounted in a bracket 94 secured to the body of the gun 30. A spring 95 acting between the bushing 93 and an enlarged head 96 of the rod 92 serves to resist this sliding movement. The action of the two springs 89 and 95 is to resist the counter-clockwise movement of the arm 85, and as the lever 91 is rocked in a counter-clockwise direction the dead-centre position of the toggle is reached and under the action of the two springs, it rapidly snaps over into the position shown in dotted lines. This gives an abrupt counter-clockwise motion of the spindle 64 as seen in Figures 6 and 7, moving the valve 63 with a snap action from engagement with the mouth of the port 65 to engagement with the mouth of the port 40, where it is held by the pressure of the springs 89 and 95. This action occurs during the movement of the plate 72 and immediately prior to the firing of the cartridge in the breech 33. Thus by the time the cartridge 33 is fired, the valve 61 has moved to block the exhaust port 60 and the valve 64 has moved to open the port 65 and close the port 40 so that the force of the explosion passes directly into the ejection cylinders 36 to provide the necessary ejective force.

It will be understood that once the sequence of operations has been initiated, either by one of the immersion switches or by the inertia switch, it proceeds completely automatically and the airman is safely ejected even if unconscious. As already mentioned, a number of immersion switches connected in pairs in series may be distributed over the aircraft, so that they will come into action whatever part of the aircraft is immersed. Immersion switches suitable for the purpose are well known and any of a variety of kinds may be used. Moreover, a number of inertia switches may be used, connected in parallel and arranged so that one or more will operate whatever the direction of the inertia shock produced by the crash landing. Again, such switches are well known and any one of a variety of types may be used for the purpose.

I claim:

1. In an aircraft having a roof with an opening, ejection apparatus, comprising in combination; a seat for an airman, guide means mounting said seat for sliding motion towards said opening in the roof of said aircraft; means for ejecting said seat through said opening at a relatively low velocity sufficient to throw said seat clear of said aircraft, an electric circuit controlling said ejection means and an electric switch in said circuit, said switch being responsive to crash landing conditions of said aircraft to close the circuit.

2. Ejection apparatus as claimed in claim 1, in which said switch is responsive to immersion in water.

3. Ejection apparatus as claimed in claim 1, in which said switch is responsive to inertia shock.

4. In an aircraft having a roof with an opening, ejection apparatus comprising in combination, a seat for an airman, guide means mounting said seat for sliding motion towards said opening in the roof of said aircraft, means for ejecting said seat through said opening at a relatively low velocity, and electric circuit means controlling said ejection means, said electric circuit means including an immersion switch and an inertia switch connected in parallel, and a gravity-operated switch connected in series with said immersion switch and said inertia switch, whereby said circuit means is interrupted when said aircraft is inverted.

5. In an aircraft having a roof with an opening, ejection apparatus comprising in combination, a seat for an airman, guide means mounting said seat for sliding motion towards said opening in the roof of said aircraft, a gunsight mounted in said aircraft and normally interrupting the passage of an airman when said seat is ejected, means for retracting said gunsight, an ejection gun for ejecting said seat through said opening at a relatively low velocity, means responsive to crash landing conditions for initiating operation of said gunsight retracting means, and means responsive to the completion of the retraction of said gunsight for operating said ejection gun.

6. In an aircraft having a roof with an opening, ejection apparatus comprising in combination, a seat for an airman, guide means mounting said seat for sliding motion towards said opening in the roof of said aircraft, an ejection gun for ejecting said seat through said opening at a relatively low velocity, said gun comprising a main breech, an auxiliary breech, an expansion cylinder, valve means selectively connecting said main breech and said auxiliary breech to said expansion cylinder, means enclosing an explosive cartridge in said auxiliary breech and means responsive to crash landing conditions of said aircraft for operating said valve means for connecting said auxiliary breech to said expansion cylinder and for detonating said cartridge.

7. In an ejection apparatus for aircraft, an ejection gun comprising in combination, an ejection cylinder, a main breech formed with a port communicating with said ejection cylinder, an auxiliary breech formed with a port communicating with said ejection cylinder, means for enclosing a cartridge in said main breech, means for firing said cartridge in said main breech, means for enclosing a relatively small cartridge in said auxiliary breech, means for firing said cartridge in said auxiliary breech, means forming an exhaust port for said main breech, means forming an exhaust port for said auxiliary breech, first valve means alternatively closing said exhaust port of said main breech and said port leading from said main breech to said ejection cylinder, second valve means alternatively closing said exhaust port of said auxiliary breech and said port leading from said auxiliary breech to said ejection cylinder, third valve means alternatively closing said port leading from said main breech to said ejection cylinder and said port leading from said auxiliary breech to said ejection cylinder, means for simultaneously operating said first and third valve means to close said exhaust port of said main breech and to open said port leading from said main breech to said ejection cylinder, and means for operating said second valve means.

References Cited in the file of this patent

UNITED STATES PATENTS

| Number | Name | Date |
|---|---|---|
| 1,956,494 | Dagnall et al. | Apr. 24, 1934 |
| 2,160,974 | Lueck | June 6, 1939 |
| 2,470,783 | Mead | May 24, 1949 |
| 2,499,993 | Gregg | Mar. 7, 1950 |
| 2,527,020 | Martin | Oct. 24, 1950 |
| 2,569,638 | Martin | Oct. 2, 1951 |
| 2,579,683 | Lobelle | Dec. 25, 1951 |

FOREIGN PATENTS

| Number | Country | Date |
|---|---|---|
| 179,936 | Switzerland | Mar. 2, 1936 |